United States Patent
Khalil et al.

(10) Patent No.: US 7,110,375 B2
(45) Date of Patent: Sep. 19, 2006

(54) VIRTUAL PRIVATE NETWORK IDENTIFICATION EXTENSION

(75) Inventors: Mohamed Khalil, Murphy, TX (US);
Emad A. Qaddoura, Plano, TX (US);
Haseeb Akhtar, Garland, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 933 days.

(21) Appl. No.: 10/011,602

(22) Filed: Dec. 4, 2001

(65) Prior Publication Data

US 2003/0002468 A1  Jan. 2, 2003

Related U.S. Application Data (60) Provisional application No. 60/301,699, filed on Jun. 28, 2001.

(51) Int. Cl.
*H04Q 7/00* (2006.01)
*H04Q 7/24* (2006.01)

(52) U.S. Cl. .................. 370/331; 370/338; 370/475

(58) Field of Classification Search ................ 370/331, 370/475, 338, 352, 401, 349
See application file for complete search history.

(56) References Cited

U.S. PATENT DOCUMENTS

| | | | | |
|---|---|---|---|---|
| 6,452,920 | B1* | 9/2002 | Comstock | 370/349 |
| 6,463,061 | B1* | 10/2002 | Rekhter et al. | 370/392 |
| 6,466,964 | B1* | 10/2002 | Leung et al. | 709/202 |
| 6,496,704 | B1* | 12/2002 | Yuan | 455/466 |
| 6,516,417 | B1* | 2/2003 | Pegrum et al. | 726/15 |
| 6,738,362 | B1* | 5/2004 | Xu et al. | 370/329 |
| 6,856,624 | B1* | 2/2005 | Magret | 370/392 |
| 6,922,404 | B1* | 7/2005 | Narayanan et al. | 370/338 |
| 6,973,057 | B1* | 12/2005 | Forslow | 370/328 |
| 2003/0088699 | A1* | 5/2003 | Luciani et al. | 709/243 |
| 2003/0105878 | A1* | 6/2003 | Ottensmeyer et al. | 709/245 |
| 2004/0202171 | A1* | 10/2004 | Hama | 370/395.1 |

OTHER PUBLICATIONS

B.Petri, NHRP Support for Virtual Private Networks, Dec. 1999, RFC2735.*
C. Perkins, IP Encapusulation within IP, Oct. 1996, RFC 2003.*
Solomon, James D., Mobile IP: The Internet Unplugged; p. 151-152, 177-180; Prentis Hall (1998).
Fox, B. and B. Gleeson, "RFC2685: Virtual Private Network Identifier," IETF (Sep. 1999).
Gleeson, B., et al., "RFC2764: A Framework for IP Based Virtual Private Networks," IETF (Feb. 2000).
Coppock, Jeffrey, "Virtual Private Networks The Future of Networking," National Association of Legislative Information Technology (Oct. 25, 1999).
Calhoun, P. and C. Perkins, "RFC2794: Mobile IP Network Access Identifier Extension for IPV4," IETF (Mar. 2000).

(Continued)

*Primary Examiner*—Ricky Q. Ngo
*Assistant Examiner*—Jonathan Liou
(74) *Attorney, Agent, or Firm*—Hemingway & Hansen, LLP; D. Scott Hemingway; Malcolm W. Pipes (57) ABSTRACT

The present invention supports a virtual private network identifier for an information packet transmission on an IP mobility system. By identifying a virtual private network in this manner, the Foreign Agent will be able to properly route data packets even if two or more Mobile Nodes are associated with virtual private networks on the same home network.

18 Claims, 4 Drawing Sheets

OTHER PUBLICATIONS

Aboba, B. et al., "RFC2486: The Network Access Identifier," IETF (Jan. 1999).

Hamzeh, K. and M. Beadles, "RFC 2637: Point-to-Point Tunneling Protocol," IETF (Jul. 1999).

* cited by examiner

VIRTUAL PRIVATE NETWORK IDENTIFICATION EXTENSION

RELATED APPLICATION DATA

This application is the utility patent application related to provisional application No. 60/301,699 filed Jun. 28, 2001.

TECHNICAL FIELD OF THE INVENTION

A modified extension format and method for use in an IP-based mobile communication system having a home network, foreign network and a mobile node.

BACKGROUND OF THE INVENTION

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

Defense Department officials requested that a system be built to permit communication between these different computer networks. The Defense Department recognized, however, that a single centralized system would be vulnerable to missile attacks or sabotage. Accordingly, the Defense Department required that the system to be used for communication between these military computer networks be decentralized and that no critical services be concentrated in vulnerable failure points. In order to achieve these goals, the Defense Department established a decentralized standard protocol for communication between network computers.

A few years later, the National Science Foundation (NSF) wanted to connect network computers at various research institutions across the country. The NSF adopted the Defense Department's protocol for communication, and this combination of research computer networks would eventually evolve into the Internet.

Internet Protocols

The Defense Department's communication protocol governing data transmission between computers on different networks was called the Internet Protocol (IP) standard. The IP standard now supports communications between computers and networks on the Internet. The IP standard identifies the types of services to be provided to users, and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was also developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

The TCP/IP Protocol

In a typical Internet-based communication scenario, data is transmitted from an applications program in a first computer, through the first computer's network hardware, and across the transmission medium to the intended destination on the Internet. After receipt at a destination computer network, the data is transmitted through the destination network to a second computer. The second computer then interprets the communication using the same protocols on a similar application program—only in reverse order. Because standard protocols are used in Internet communications, the TCP/IP protocol on the second computer decodes the transmitted information into the original information transmitted by the first computer.

One of the rules in TCP/IP communications is that a computer user does not need to get involved with details of data communication. In order to accomplish this goal, the TCP/IP standard imposes a layered communications system structure. All the layers are located on each computer in the network, and each module or layer is a separate component that theoretically functions independent of the other layers. As an alternative, User Datagram Protocol ("UDP") supports the same type of layered protocol communication system, but with less accuracy checking on message content than the TCP/IP protocol.

TCP/IP and its related protocols form a standardized system for defining how data should be processed, transmitted and received on the Internet. TCP/IP defines the network communication process, and more importantly, defines how a unit of data should look and what information the message should contain so that the receiving computer can interpret the message correctly. Because of the standardized layer design of TCP/IP, a consistent conversion of base data is ensured regardless of the version or vendor of the TCP/IP conversion software.

TCP/IP Addressing and Routing

A computer operating on a network is assigned a unique physical address. On a Local Area Network ("LAN"), the physical address of the computer is a number given to computer's network adapter card. Hardware LAN protocols use this physical address to deliver packets of data, sometimes called information packets, to computers on the LAN.

On the Internet, the TCP/IP protocol routes information packets using logical addressing. The network software in the Network Layer generates logical addresses. Specifically, a logical address in the TCP/IP network is translated into a corresponding physical address using the ARP (Address Resolution Protocol) and RARP (Reverse Address Resolution Protocol) protocols in the Network Layer.

The TCP/IP's logical address is also called an IP address. The IP address can include: (1) a network ID number identifying a network, (2) a sub-network ID number identifying a sub-network on the network, and, (3) a host ID number identifying a particular computer on the sub-network. The header data in the information packet will include source and destination addresses. The IP addressing scheme imposes a sensible addressing scheme that reflects the internal organization of the network or sub-network.

A computer network is often subdivided into smaller sub-networks. The computer network is divided in this manner to increase data transmission efficiency and reduce overall network traffic. Routers are used to regulate the flow of data into and out of designated sub-networks of the computer network.

A router interprets the logical address of an information packet, such as an IP address, and directs the information packet across the network to its intended destination. Information packets addressed between computers on the sub-network do not pass through the router to the greater network, and therefore does not clutter the transmission lines of the greater network. If data is addressed to a computer outside the sub-network, however, the router forwards the data onto the larger network.

The TCP/IP network includes protocols that define how routers will determine the path for data through the network. Routing decisions are based upon information in the IP packet header and entries in each router's routing table. A routing table possesses sufficient information for a router to make a determination on whether to accept the communicated information on behalf of a destination computer, or pass the information onto another router in the network. The routing table also permits the router to determine where the information should be forwarded within the network or sub-network.

The routing table can be configured manually with routing table entries or a dynamic routing protocol that can accommodate changing network topologies—network architecture, network structure, layout of routers, and interconnections between hosts and routers. In a dynamic routing protocol, a router advertises reachability when it sends updated routing information to a second router claiming that the first router is capable of reaching one or more destination addresses. Advertising accessibility is important to the process of receiving, directing and redirecting information packets on the Internet.

The IP-Based Mobility System

Internet protocols were originally developed with an assumption that Internet users, which are assigned a unique IP address, would be connected to a single, fixed network—that is, one physical fixed location. With the advent of portable computers and cellular wireless communication systems, however, the movement of Internet users within a network and across network boundaries has become quite common. Because of this highly mobile Internet usage, the implicit design assumptions for the Internet protocols have been violated.

The IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will always be associated with a single Mobile Node home network for IP addressing purposes.

The home network has a Home Agent and the foreign network has a Foreign Agent—both of which control the routing of information packets into and out of their network.

Registration of a Mobile Node

The Mobile Node keeps the Home Agent informed of its current location by registering a care-of address with the Home Agent. Essentially, the care-of address represents the current foreign network where the Mobile Node is located. If the Home Agent receives an information packet addressed to the Mobile Node while the Mobile Node is located on a foreign network, the Home Agent will "tunnel" the information packet to the Mobile Node's current location on the foreign network via the applicable care-of address.

The Foreign Agent participates in informing the Home Agent of the Mobile Node's current care-of address. The Foreign Agent also de-tunnels information packets for the mobile node after the information packets have been forwarded to the Foreign Agent by the Home Agent. Further, the Foreign Agent serves as a default router for out-going information packets generated by the mobile node while connected to the foreign network.

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile Nodes examine the agent advertisement and determine whether they are connected to the home network or a foreign network.

If the Mobile Node is located on its home network, no additional actions need to be taken because information packets will be routed to the Mobile Node according to the standard addressing and routing scheme. If the Mobile Node is visiting a foreign network, however, the Mobile Node obtains appropriate information from the agent advertisement, and transmits a registration request message to its Home Agent. The registration request message will include a care-of address for the Mobile Node.

The registered care-of address identifies the foreign network where the mobile node is located, and the Home Agent uses this registered care-of address to tunnel information packets to the foreign network for subsequent transfer to the mobile node. A registration reply message may be sent to the Mobile Node by the Home Agent to confirm that the registration process has been successfully completed.

Authenticate, Authorize and Accounting ("AAA")

In an IP-based mobile communications system, the Mobile Node changes its point of attachment to the network while maintaining network connectivity. The Mobile IP Protocol (RFC 2002) assumes that mobile IP communications with a Mobile Node will be performed on a single administrative domain or a single network controlled by one administrator.

When a Mobile Node travels outside its home administrative domain, however, the Mobile Node must communicate through multiple domains in order to maintain network connectivity with its home network. While connected to a foreign network controlled by another administrative domain, network servers must authenticate, authorize and collect accounting information for services rendered to the Mobile Node. This authentication, authorization, and accounting activity is called "AAA", and AAA servers on the home and foreign network perform the AAA activities for each network.

Authentication is the process of proving someone's claimed identity, and security systems on a mobile IP network will often require authentication of the system user's identity before authorizing a requested activity. The AAA server authenticates the identity of an authorized user, and authorizes the Mobile Node's requested activity. Additionally, the AAA server will also provide the accounting function including tracking usage and charges for use of transmissions links between administrative domains.

Mobile IP Extensions

Extensions, as defined in different IP protocols, support the transmission of variable amounts of information in an information packet, the registration of a Mobile Node, or the AAA functions performed by AAA network servers. The general extension mechanism allows appropriate information to be carried by a control message or similar types of discovery messages, agent advertisements, registration requests, or registration replies.

Virtual Private Networks

A Virtual Private Network (VPN) emulates a private internet network over a shared physical infrastructure. By way of example a VPN can reside within a LAN system, or on one of several different servers on one or more service providers. A VPN can thus span multiple computer servers or systems and multiple VPNs can co-exist within this host infrastructure, but the VPN does not exist on non-host infrastructures.

A VPN can be used to extend the IP capability of a corporate network to remote offices or users possessing internet, extranet, or dial-up services. In this way, connectivity in the same manner as a dedicated private network can be achieved without the necessity of funding for equipment and support infrastructure.

A service provider, or other network structure, provides the physical system and computer infrastructure within which the "virtual" network resides. In this manner, the VPN can function much the same as a single, physical network despite the intervening host infrastructure. A number of different types of VPNs are suggested in RFC 2764, but this is by no means an exhaustive list of possible VPN constructs. The distinguishing hallmark of a VPN is that it is a single, logical network found on a public or private computer infrastructure and the VPN may reside upon one or more autonomous systems.

Tunneling

The general IP communication protocol with Home Agents, Mobile Nodes, and Foreign Agents occurs thusly:

1. Home Agents and Foreign Agents advertise their presence on any attached links by periodically broadcasting agent advertisements.
2. Mobile Nodes receive the agent advertisement and compares the advertisement with their stored communication protocols to determine if they are connected to a Foreign Agent.
3. If connected to a Foreign Agent, the Mobile Node acquires a care-of address, which is read from the data fields within the Foreign Agent's agent advertisement.
4. The Mobile Node registers the care-of address with its Home Agent by forwarding a Registration Request Message (IPV4 standard) or Binding Update Message (IPV6 standard) to the Home Agent.
5. The Home Agent takes any data packets addressed to the Mobile Node and tunnels them to the Mobile Node by encapsulating the data packet with the care-of address.
6. The data packet is "tunneled" to the care-of address, where the Foreign Agent decapsulates the original data packet from the tunnel and delivers the data packet to the Mobile Node. The Foreign Agent serves as the router for all the data packets generated by the Mobile Node.

Tunneling is the basic methodology in IP communication by which a data packet is routed to the appropriate internet node through an intermediate internet address. Typically, a data packet with network routing is "encapsulated" by IP address information.

Encapsulation involves adding an outer IP header to the original IP header fields. In this manner, a "tunnel" can be constructed. The outer IP header contains a source and destination IP address—the "endpoints" of the tunnel. The inner IP header source and destination addresses identify the original sender and destination addresses.

The original sender and recipient addresses remain unchanged, while the new "tunnel" endpoint addresses are grafted upon the original data packet. This alters the original IP routing by delivering the data packet to an intermediate destination node (in this case the Foreign Agent), where it is "decapsulated" or "de-tunneled" yielding the original data packet and routing. The packet is then delivered according to the destination found in the original IP address.

The important concept to keep in mind is that the "tunnel" is established by encapsulating a data packet containing the original IP address of the Mobile Node and an IP source address with the intermediate routing IP address (i.e. care-of address) of the foreign network. After the Foreign Agent decapsulates the data packet, the Foreign Agent in turn routes the data packet using the assigned Home Address of the Mobile Node found in the original data packet.

SUMMARY OF THE INVENTION

There are problems with the routing of information packets to Mobile Nodes associated with one or more VPNs. Because several VPNs may reside inside the same or multiple providers or autonomous systems, a possibility exists that two or more Mobile Nodes that are part of two separate VPNs may nevertheless share the same or very similar IP addresses. If two Mobile Nodes share the same IP address and are using the same foreign network, data packets will invariably be routed to the wrong Mobile Node by the Foreign Agent. The invention ensures that a Foreign Agent will properly identify a Mobile Node belonging to any one VPN, so that even if two Mobile Nodes sharing the same IP Address are located on the foreign network, the Foreign Agent will properly route information packets to the appropriate destination Mobile Node.

Under the current communication protocols, Foreign Agents and Home Agents periodically broadcast an agent advertisement to all nodes on that local network. The Mobile Node examines the agent advertisements. If the Mobile Node is on a foreign network, the Mobile Node obtains appropriate information from the agent advertisement and transmits a care-of address to the Home Agent in a registration request message. The Home Agent then routes information packets intended for the Mobile Node using the care-of address to the Foreign Agent, which in turn routes the information to the Mobile Node.

Under the invention, the registration request message is modified to contain a special VPN Identifier. A new flag bit is added to signify the presence of a two-part VPN Identifier that uniquely identifies a VPN. This VPN Identifier (VPNI) extension consists of the VPN Organizational Unique Identifier (VPN-OUI) and VPN Index. The first part is a 24-bit VPN-OUI that uniquely designates the VPN authority, which serves as the primary administrator. This authority may be a company, organization, service provider, or some other entity responsible for administering and managing the VPN as well as arranging for the underlying host computer infrastructure. The second part of the identifier is a 32-bit VPN Index that identifies the particular VPN serviced by the VPN authority.

The VPN Identifier can be used by the Home Agent and the Foreign Agent to encapsulate information packets for "tunneling." This tunneling protocol must be used by both the Home Agent and Foreign Agent to transmit information between them. Once received by the Home or Foreign Agent, the tunneled packet is routed accordingly using the original IP address header and VPNI header as appropriate. With this routing protocol, the Foreign Agent will correctly route information packets, even if two Mobile Nodes belonging to different VPNs on the same home network share the same or very similar IP address.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figures 1, 2:
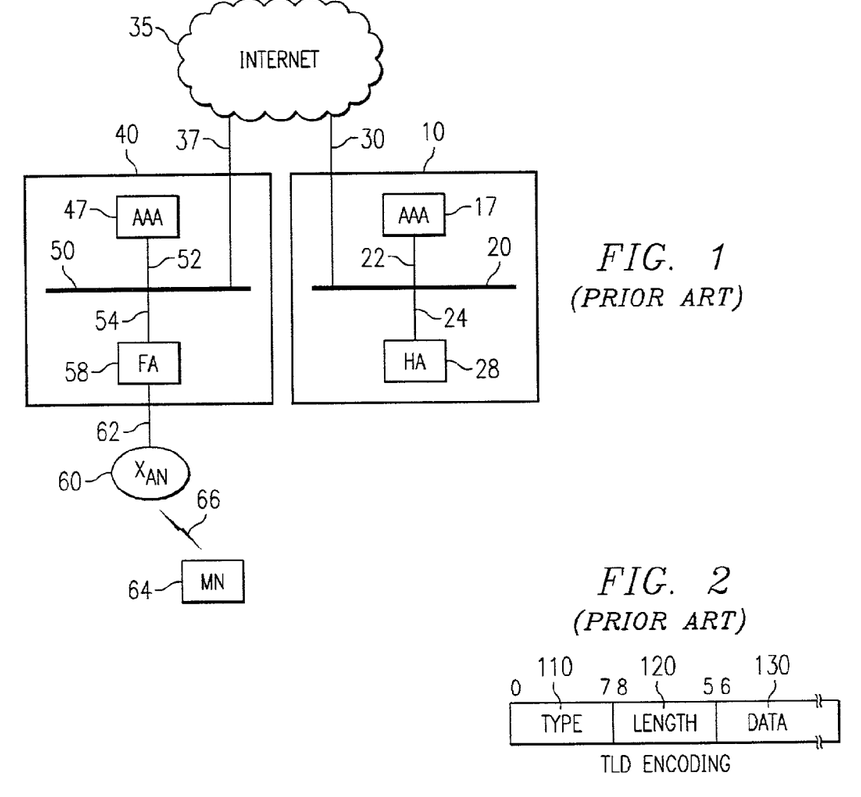
FIG. 1 is a prior art schematic diagram of a mobile IP wireless communications network.
FIG. 2 is a general extension format.

Mobile IP protocols support the routing of data communications to mobile nodes through the Internet. As shown in FIG. 1, a mobile IP communications system can be represented by two networks coupled to the Internet 35, as represented by the cloud 35 of constituent networks.

In FIG. 1, the overall architecture of the IP-based mobile system is shown with a Mobile Node 64, a home network 10 and a foreign network 40. The home network 10 has a central buss line 20 coupled to the Home Agent 28 via communication link 24, and the buss line 20 is coupled to the AAA server 17 via communication link 22. The home network 10 is coupled to the public Internet 35 via communication link 30. A communications link is any connection between two or more nodes on a network or users on networks or administrative domains.

The foreign network 40 has a central buss line 50 coupled to the foreign agent 58 via communication link 54, and the buss line 50 is coupled to the AAA foreign network server 47 via communication link 52. The foreign network 40 is coupled to the public Internet 35 via communication link 37.

Mobile Node 64 is shown electronically coupled to the foreign network 40 via the wireless communication link 66 of transceiver 60. Transceiver 60 is coupled to the foreign network 40 via communication link 62. The Mobile Node 64 can communicate with any transceiver or Access Network coupled to the foreign network 40.

The terms Home Agent and Foreign Agent may be defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network having the responsibility to manage mobility-related functionality for a Mobile Node on a home network. Likewise, the term Foreign Agent, as used in this application, can refer to a Serving Mobility Manager, Visited Location Register, Visiting Serving Entity, or any other agent on a foreign network having the responsibility to manage mobility-related functionality for a Mobile Node on a foreign network.

In the mobile IP communications system, the Mobile Node 64 may be identified by a permanent IP address. While the Mobile Node 64 is coupled to its home network 10, the Mobile Node 64 functions as any other fixed node on that network. When the Mobile Node 64 moves from its home network 10 to a foreign network 40, however, the home network 10 sends data communications to the Mobile Node 64 by "tunneling" the communications to the foreign network 40 where the Mobile Node 64 is located.

The Mobile Node 64 keeps the Home Agent 28 informed of its current location by registering a care-of address with the Home Agent 28. Essentially, the care-of address represents the current foreign network 40 where the Mobile Node is located. If the Home Agent 28 receives an information packet addressed to the Mobile Node 64 while the Mobile Node 64 is located on a foreign network 40, the Home Agent 28 will "tunnel" the information packet to the Mobile Node's 64 current location on the foreign network 40 via the applicable care-of address.

The Foreign Agent 58 participates in informing the Home Agent 28 of the Mobile Node's 64 current care-of address. The Foreign Agent 58 also decapsulates or de-tunnels information packets for the Mobile Node 64 after the information packets have been forwarded to the Foreign Agent 58 by the Home Agent 28. Further, the Foreign Agent 58 serves as a default router for out-going information packets generated by the Mobile Node 64 while connected to the foreign network 40.

If the Mobile Node 64 is located on its home network 10, no additional action needs to be taken because information packets will be routed to the Mobile Node 64 according to the standard addressing and routing scheme. If the Mobile Node 64 is visiting a foreign network 40, however, the Mobile Node 64 obtains appropriate information from the agent advertisement, and transmits a registration request message to its Home Agent 28. The registration request message will include a care-of address for the Mobile Node 64.

The registered care-of address identifies the foreign network 40 where the Mobile Node 64 is located, and the Home Agent 28 uses this registered care-of address to tunnel information packets to the foreign network 40 for subsequent transfer to the Mobile Node 64. A registration reply message may be sent to the Mobile Node 64 by the Home Agent 28 to confirm that the registration process has been successfully completed.

Registration of Mobile Nodes

A care-of address identifies the foreign network 40 where the Mobile Node 64 is located. Mobile IP protocols require that the mobile node register the care-of address with the Home Agent 28 and/or the AAA server 17 on the home network 10 after movement to a new network. As part of the registration process, a registration request is issued by the Mobile Node 64 in response to power-up on the foreign network 40 or receipt of an agent advertisement. The registration request is sent to the Home Agent 28 and/or the AAA server 17 on the home network, and a registration reply is issued by the Home Agent 28 to the Mobile Node 64 to confirm registration of the care-of address with the Home Agent 28. The registration is transmitted from Mobile Node 64 or the Foreign Agent 58 to the Home Agent 28 via Internet 35. The AAA server 17 also allows the Mobile Node 64 to access the home network 10.

"Tunneling" of Information Packets

After registration, all communications addressed to the Mobile Node 64 are still routed according to normal IP protocols to the mobile node's home network 10. After the Home Agent 28 receives this communication, however, the Home Agent 28 sends, or "tunnels", the message to the Mobile Node 64 at the foreign network 40 via the care-of address. The Foreign Agent 58 accepts the re-directed communication and delivers this communication to the mobile node located on its network.

In the system shown in FIG. 1, the Mobile Node 64 would have a care-of address of the foreign network 40, and the Mobile Node 64 would have registered its care-of address with the Home Agent 28. When an information packet is sent to the Mobile Node 64, these information packets would be sent to the Home Agent 28 as the agent advertising accessibility to the Mobile Node 64 on the networks.

The Home Agent 28 would transfer, or tunnel, the information packets to the Foreign Agent 58 at the care-of address for the Mobile Node 64. The Foreign Agent 58 would, in turn, transfer the information packets to the Mobile Node 64 through the transceiver 60. In this manner, the information packets addressed to the Mobile Node 64 at its usual address on the home network 10 are re-directed to the Mobile Node 64 on the foreign network 40.

The general information extension format used in an information packet is shown in FIG. 2 as a Type-Length-Data (TLD) format. As shown in FIG. 2, the Type 110 variable (designated by "T") occupies the first 8 bits of the general extension, the Length 120 variable (designated by "L") occupies the next 8 bits of the general extension, and the Data 130 variable (designated by "D") occupies the remaining bits in the general extension based upon the data content (type and length). The Type 110 variable indicates the particular type of extension found therein, and the Length 120 indicates the length in bytes of the data field within the extension. The Data 130 field may be zero or more bytes in length, and sets forth the applicable data that is being transmitted.

Figure 3:
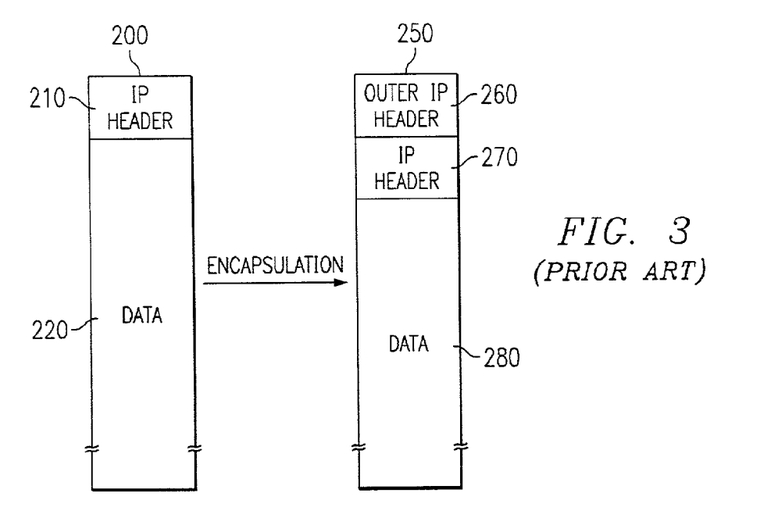
FIG. 3 is a prior art general representation of encapsulation used in the IP tunneling protocol.

The basic tunneling protocol which is used to route data to the correct destination node is shown in FIG. 3. The Home Agent "encapsulates" or "tunnels" the original data packet 200, which contains original IP address routing in an IP Header 210 and data 220 that is being transmitted to the Home Agent, with a new Outer IP Header 260 (i.e. the foreign network IP address) for routing to an intermediate destination (i.e. the foreign network). The Foreign Agent "decapsulates" or "de-tunnels" the encapsulated data packet 280 from the encapsulated information packet 250 and routes the data payload 280 to the Mobile Node 64 based on the original IP address (IP Header 270).

Routing Packets With Virtual Private Networks

A Virtual Private Network (VPN) exists on a host infrastructure, and is a single, logical network residing on one or more autonomous computer systems on the host system. The present invention is not limited to a particular type of VPN, but is applicable in any network which emulates a private network over a public or shared infrastructure.

In the model of FIG. 1, the VPN resides within the home network 10. This home network may be one or more autonomous systems. The home network 10 is coupled to the public Internet 35 via communication link 30, which may be two or more nodes on a network or users on networks or administrative domains. Moreover, this communication interface over the public Internet may connect portions of the VPN, which can reside on one or more network systems.

The Mobile Node 64 is shown coupled to the foreign network 40 via the wireless communication link 66 of transceiver 60. As already noted, in a mobile IP communication system, the Mobile Node 64 may be identified by a permanent IP address. However, if two Mobile Nodes belong to two separate VPNs residing on home network 10, then the Mobile Nodes may share the same IP address. Any communications to the Mobile Nodes located on a foreign network 40 may be "scrambled" by the Foreign Agent 58, because it cannot properly route the data due to the identical or nearly identical IP addresses of the two Mobile Nodes.

Figure 4:
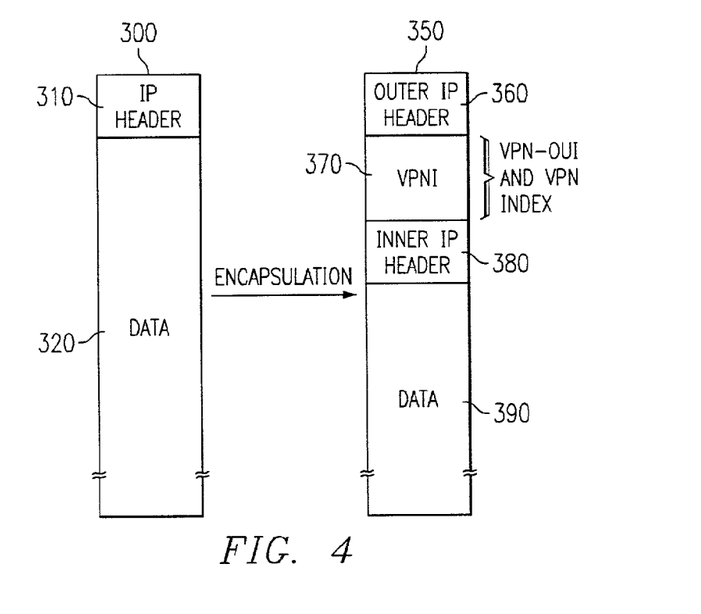
FIG. 4 a general representation of the encapsulation used in the invention for VPN tunneling.

In the present invention, a VPN Identifier (VPNI) Extension is used to route the information packets. A VPNI Extension is incorporated into a data packet to properly tunnel the information packet, and FIG. 4 shows how the VPNI is incorporated into an information packet. The original information packet 300 is "encapsulated" adding an Outer IP Header 360 with intermediate routing (e.g. care-of address) and the VPNI extension 370. The modified information packet 350, contains an Outer IP Header 360, a VPNI extension 370, an Inner IP Header 380, and the transmitted data 390. The transmitted data 390 is identical to the original data 320. The original IP Header 310 is the Inner IP Header 380. The VPNI Extension 370 identifies the VPN to which the Mobile Node 64 belongs, and further specifies the destination mobile node. When the Foreign Agent 58 decapsulates the modified packet 350, the data 390 can be correctly routed to the correct mobile node using the VPNI 370. Essentially, the Foreign Agent 58 uses the identifying information in the VPNI 370, together with the other identifying address information in the information packet, to properly direct the data payload 390.

The VPNI Extension and Tunneling

Extensions have been defined to support the transmission of information packets on the Internet, the registration of a Mobile Node 64, or the AAA functions performed by the AAA server 17. The general extension mechanism allows appropriate information to be carried by a control message or similar types of discovery messages, agent advertisements, registration requests, or registration replies.

Figure 5:
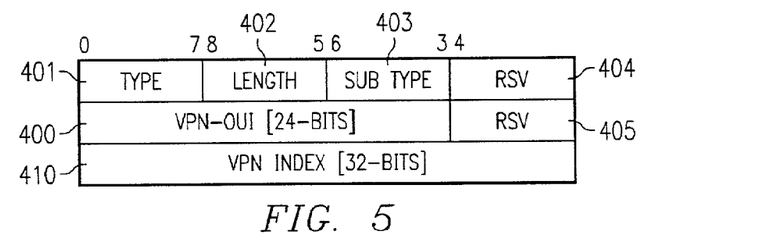
FIG. 5 is the general format for the VPN Identifier Extension of the invention.

The VPNI Extension follows the general TLD format as shown in FIG. 5. The Type field 401, Length field 402, and Subtype field 403 all correspond to prior extension formats. The VPNI Extension has two parts. The first part is the 24-bit VPN Organizational Unique Identifier (VPN-OUI) 400. This identifies the primary network authority, which serves as the administrator for the VPN. This may be a company, organization, service provider, or some other entity, and it is responsible for administering and managing the VPN. The network authority is also responsible for providing the underlying physical infrastructure that the VPN resides upon. The remainder of the 32-bit data field is an 8-bit reserved field 405 in the extension.

The second part of the VPNI is the 32-bit VPN Index 410. This identifies the particular VPN serviced by the VPN authority and provides a unique identifier for each VPN that a VPN authority is responsible for. This two-part VPNI provides a mechanism whereby a VPN can be uniquely designated and permit proper routing of information to the VPN or an associated Mobile Node using the VPNI as part of a TCP/IP header in an information packet.

Figure 6:
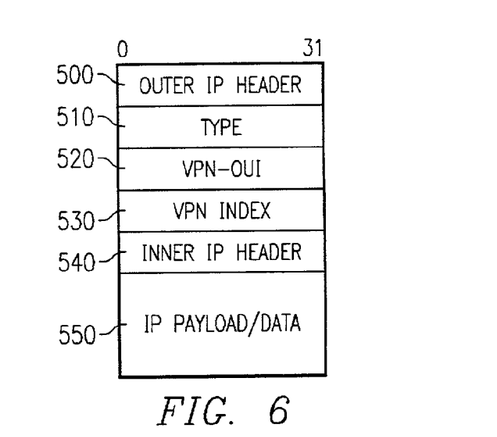
FIG. 6 is the general representation of the VPN Identifier Extension as incorporated into an encapsulated data packet under the invention.

FIG. 6 shows how the VPNI is incorporated into an encapsulated information packet for routing using the VPN Identifiers. The Outer IP Header 500 contains the IP routing information for the data packet to its intermediate destination—either the home network or the foreign network. Once at the intermediate destination, the packet is decapsulated and routed according to the VPNI extension headers (the VPNI-OUI 520 and VPN Index 530) by the Foreign Agent 58 or the Home Agent 28. The Inner IP Header 540 contains the original IP routing information with reference to Mobile Node 64. The IP Payload 550 is the data that is being sent to or from the Mobile Node 64.

Figure 7:
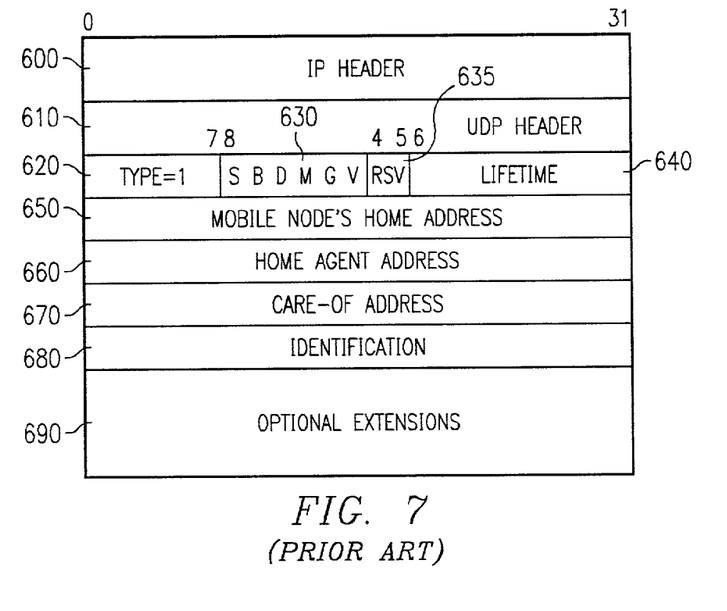
FIG. 7 is a generalized prior art Registration Request Message format in the IPV4 standard.

The prior art Registration Request Message shown in FIG. 7 is a generalized representation of the message format. The IP Header 600 contains a number of data fields setting out the IP source address and IP destination address. The UDP Header 610 contains a number of fields and is an application interface with the IP address protocol. The Type field 620 identifies the type of message, and a value of '1' signifies that the message is a registration request. The flag bit fields 630 are an 8-bit long set of one-bit flags that control routing of the message. The first 6-bits are designated 'S', 'B', 'D', 'M', 'G', and 'V'. The remaining 2-bits 635 of this 8-bit field are reserved and are presently not utilized. The Lifetime field 640 is set by the Mobile Node 64 and is the number of seconds that it wants the registration to last before expiring.

The Mobile Node's Home Address field 650 is a 32-bit field containing the IP address of the Mobile Node's home network 10. The Home Agent Address field 660 is a 32-bit field containing the IP address of the Home Agent 28. The Care-of Address field 670 is a 32-bit field containing the care-of address of the foreign network 40 that the Mobile Node 64 is located upon. The Identification field 680 is a 64-bit field containing a value chosen by the Mobile Node 64 and is unique for each registration attempt. This serves as a security check and allows the Mobile Node 64 to know which of several possible Registration Requests match the corresponding Registration Reply. The Optional Extension field 690 exists where any optional extension can be placed, and it has no set length.

Figure 8:
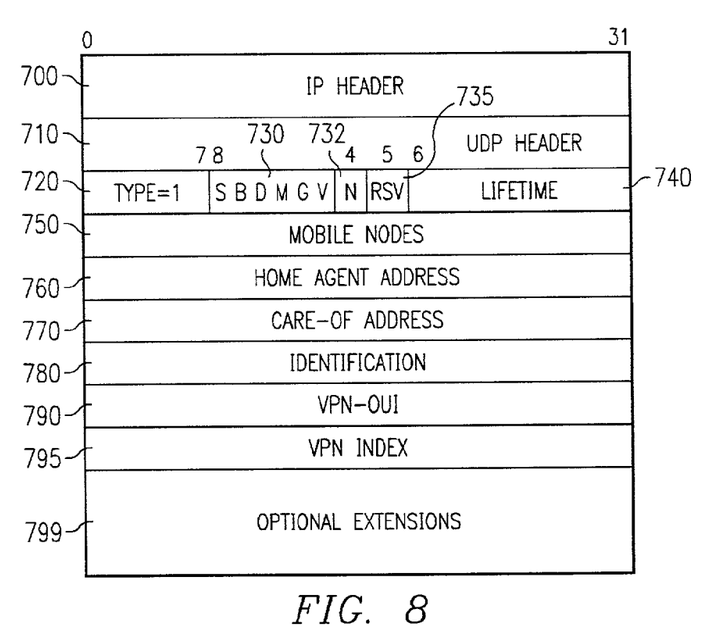
FIG. 8 is a generalized Registration Request Message format in the IPV4 standard using the invention.

The modified Registration Request Message using the VPN Identifier is shown in FIG. 8. The IP Header 700 contains a number of data fields setting out the IP source address and IP destination address. The UDP Header 710 contains a number of data fields and is an application interface with the IP address protocol. The Type field 720 identifies the type of message, and a value of '1' signifies that the message is a registration request. The flag bit fields 730 are an 8-bit long set of one-bit flags that control routing of the message. The first 6-bits are designated 'S', 'B', 'D', 'M', 'G', and 'V'. A one-bit 'N' bit field 732 is added to the message. The N bit is a flag bit that indicates whether the VPN Identifier is being used. The final bit 735 in the 8-bit field remains unused. The Lifetime field 740 is set by the Mobile Node 64 and is the number of seconds that it wants the registration to last before expiring.

The Mobile Node's Home Address field 750 is a 32-bit field containing the IP address of the Mobile Node's home network 10. The Home Agent Address field 760 is a 32-bit field containing the IP address of the Home Agent 28. The Care-of Address field 770 is a 32-bit field containing the care-of address of the foreign network 40 that the Mobile Node 64 is located upon. The Identification field 780 is a 64-bit field with a value chosen by the Mobile Node 64 and is unique for each registration attempt. This serves as a security check and allows the Mobile Node to know which of several possible Registration Requests match the corresponding Registration Reply. The VPN-OUI field 790 is a 32-bit field which includes the 24-bit VPN-OUI. The 8-bits after the VPN-OUI are reserved. The VPN Index 795 is a 32-bit field and contains the VPN Index. The Optional Extension field 799 is an optional extension that can be placed in the information packet, but it has no set length.

Figure 9:
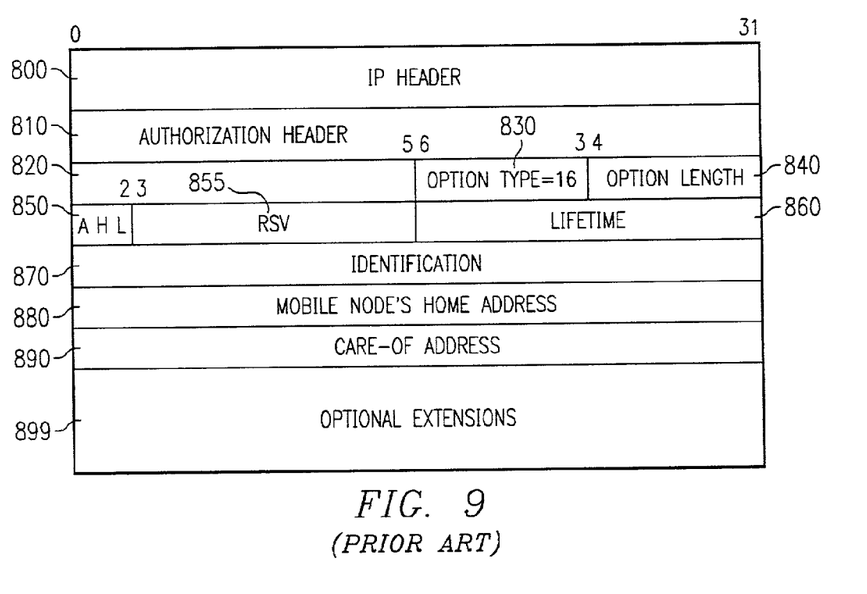
FIG. 9 is a generalized prior art Binding Update Message format in the IPV6 standard.

The Binding Update Message format for IVP6 is shown in FIG. 9. The IP Header fields 800 contain data fields setting out the IP source address and destination address. The Authentication Header field 810 xcontains several fields containing data used in the IPV6 standard to authenticate the transmission. The data fields in 820 are not presently designated to carry information, but the Option Type field 830 is a 8-bit field that specifies the type of message (i.e. option; e.g. binding update, binding acknowledgment, etc.). The Option Length field 840 specifies the length of any option/message. The flag bit field 850 is a 16-bit long set of one-bit flags that control routing of the message. Only the first 3-bits have been designated, and these are designated 'A', 'H', and 'L'. The remaining 13-bits 855 of this 16-bit field are reserved. The Lifetime field 860 is a 16-bit field set by Mobile Node 64 and is the number of seconds the Mobile Node wants the registration to last before expiring.

The Identification field 870 is a 64-bit field with a value chosen by the Mobile Node 64 and is unique for each registration request attempt. This serves as a security check and allows the Mobile Node 64 to determine which of several possible Binding Update Requests match the corresponding Binding Update Messages. The Mobile Node's Home Address field 880 is a 128-bit field containing the IP address of the Mobile Node's home network 10. The Care-of Address field 890 is a 128-bit field containing the care-of address of the foreign network 40 that the Mobile Node 64 is located upon. Optional Extensions 899 can be added after the Care-of Address field 890.

Figure 10:
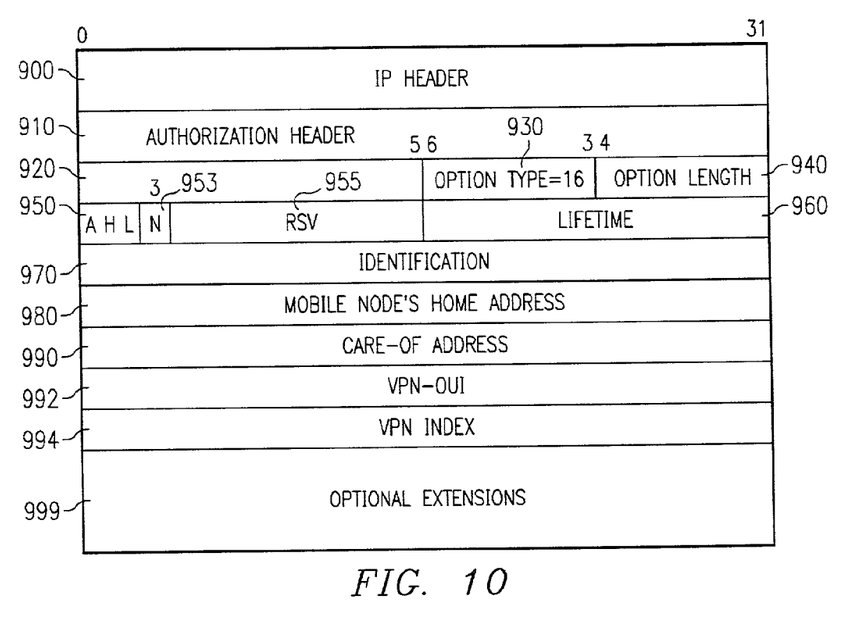
FIG. 10 is a generalized Binding Update Message format in the IPV6 standard using the invention.

The Binding Update Message format modified using the VPN Identifier is shown in FIG. 10. The IP Header fields 900 contain data fields setting out the IP source address and destination address. The Authentication Header fields 910 contain several fields of data used in the IPV6 standard to authenticate the transmission. The data fields in 920 do not presently carry data or identifiers. The Option Type field 930 is a 8-bit field that specifies the type of message (i.e. option; e.g. binding update, binding acknowledgment, etc.). The Option Length field 940 specifies the length of any option/message. The flag bit field 950 is a 16-bit long set of one-bit flags that control routing of the message. The first 3-bits retain the same 'A', 'H', and 'L' designations.

A one-bit 'N' field 953 is added as a flag bit to designate whether VPN Identifier information exists in the information packet. The remaining 12-bits 955 of this 16-bit field remain reserved. The Lifetime field 960 is a 16-bit field set by Mobile Node 64 and is the number of seconds the Mobile Node wants the registration to last before expiring. The Identification field 970 is a 64-bit field is a value chosen by the Mobile Node and is unique for each registration attempt. This serves as a security check and allows the Mobile Node to know which of several possible Binding Update Requests match the corresponding Replies. The Mobile Node's Home Address field 980 is a 128-bit field containing the IP address of the Mobile Node's home network 10. The Care-of Address field 990 is a 128-bit field containing the care-of address of the foreign network 40 that the Mobile Node 64 is located upon. The VPN-OUI field 992 is a 32-bit field in which the 24-bit VPN-OUI under the invention is found. The final 8-bits are reserved. The VPN Index 994 is a 32-bit field and contains the VPN Index under the invention. Optional Extensions 899 can be added as well.

In each modified message, a new 'N' field (732 and 953) has been added to the flag bit field. When set to '1', this 'N' field signifies that Mobile Node 64 is part of a VPN residing on home network 10 and that the message contains a VPNI Extension. This VPNI extension, as shown in FIG. 5, 400 and 410, is grafted upon the registration request message as shown in FIGS. 8 at 790 and 795, or binding update messages as shown in FIG. 10 at 992 and 994.

The generalized tunnel protocol using the VPN Identifiers is shown in FIG. 4. The original data packet 300 is encapsulated into a data packet 350 used for "tunneling" between the Home Agent 28 and the Foreign Agent 58. The VPNI extension 370 and Outer IP Header 360 (the intermediate routing through a care-of address) is added by either the Home Agent 28 or Foreign Agent 58. The Home Agent 28 and Foreign Agent 58 thus encapsulate the data packet for transmission and decapsulate the data packet for further routing upon receipt according to the VPNI extension 370 and Outer IP Header 360.

Using the VPN Identifiers, when connected with the Foreign Agent 58, the Mobile Node 64 receives an agent advertisement from the Foreign Agent informing it that it is on a foreign network. Included in the agent advertisement is the care-of address, which the Mobile Node 64 sends to the Home Agent 28 via either a Registration Request Message (IPV4 standard) in FIG. 8 or Binding Update Message (IPV6 standard) in FIG. 10. When the 'N' bit (735 and 953) is set to '1' in the flag bit fields (730 and 950), both the Home Agent 28 and the Foreign Agent 58 must use the tunneling protocol shown in FIGS. 4 and 6 to tunnel the information packets between those agents. The 'N' bit also signifies the presence of a VPNI Extension field (790, 795, 992 and 994) in addition to a care-of address (770 and 990) to incorporate into the tunneling protocol.

The care-of address is the IP address of the current foreign network 40 where the Mobile Node 64 is located. After registering a care-of address and VPNI with the Home Agent 28 using either a Registration Request Message (FIG. 8) or Binding Update Message (FIG. 10), the Home Agent 28 will encapsulate any received information packet addressed to the Mobile Node 64 with the care-of IP address of the foreign network 40 and the VPNI extension. The encapsulated data packet 350 will thus include the VPNI as shown in FIGS. 4 (370) and 6 (520 and 530). The Home Agent 28 will "tunnel" the information packet 350 to the Mobile Node's 64 current location on the foreign network 40 via the applicable care-of address, routing the information through the Foreign Agent 58.

The Foreign Agent 58 receives the information packet 350 destined for Mobile Node 64 and decapsulates or de-tunnels the data packet. The Foreign Agent 58 then routes the packet to the Mobile Node 64 according to the VPNI Extension, which provides a unique identity for the VPN associated with Mobile Node 64. For any data sent from the Mobile Node 64, the Foreign Agent 58 will also encapsulate the data with the IP address for the home network as well as the VPNI. The VPNI address will then permit the Home Agent 28 to route the data packet to the VPN. The information packet sent to the Home Agent 28 is de-tunneled and routed according to the VPNI and/or any IP address attached to the data packet under the standard TCP/IP communication protocol. All data communication between the Home Agent 28 and Foreign Agent 58 is encapsulated using the VPNI and tunneled accordingly by the Home Agent 28 or Foreign Agent 58 as shown in FIGS. 4 and 6.

In the typical situation under the prior art, when the Mobile Node 64 transmits a registration request or binding update message, the Home Agent 28 will issue an acknowledgement. However, under the invention, when the 'N' field is set to '1', the Home Agent 28 will not transmit an acknowledgement to the messages.

While the invention has been particularly shown and described with respect to preferred embodiments, it will be readily understood that minor changes in the details of the invention may be made without departing from the spirit of the invention.

The invention claimed is:

1. A communications system, comprising:
   a home network having a home agent coupled to a home network computer system;
   a virtual private network residing on the home network;
   a foreign network having a foreign agent coupled to a foreign network computer system; and
   a mobile node associated with the virtual private network and located on the foreign network, said mobile node receiving information packets having a virtual private network identifier extension that designates the virtual private network associated with said mobile node, and a predetermined amount of data address space to identify a virtual network authority and a specified virtual private network of a plurality of associated virtual private networks, said virtual private network identifier extension transmitted in a registration message and being encapsulated in the information packets for tunneling between the home agent and the foreign agent, and said virtual private network identifier extension having two parts, with a first part identifying a first address component of the virtual private network and a second part identifying a second address component associated with the first component, said first component having a plurality of associated second address components.

2. The communications system in claim 1 wherein the virtual private network identifier is used by the home agent to identify the virtual private network extension.

3. The communications system in claim 1 wherein the virtual private network identifier extension is identified using a registration request message.

4. The communications system in claim 1 wherein the virtual private network identifier extension is identified using a binding update message.

5. The communication system in claim 1 wherein the virtual private network identifier extension contains a virtual private network organizational identifier to identify the network authority as the first part and a virtual private network index to identify the specific administered private network as the second part.

6. The communications system in claim 1 wherein the information packet contains a flag bit field that is set to indicate the presence of a virtual private network identifier extension.

7. The communications system in claim 1 wherein more than one virtual private networks reside on the physical infrastructure of the home network and each network is designated by the virtual private network identifier extension.

8. The method of transmitting an information packet to a mobile node associated with a virtual private network comprising the steps of:
providing a home network with the virtual private network;
providing a foreign network where the mobile node is located;
encapsulating the information packet for delivering to the mobile node with a virtual private network identifier extension occupying at least seven bytes of available data space within the information packet address header to identify the specific virtual private network administered by an identified virtual private network authority having a bifurcated address extension and a foreign network address;
transmitting the information packet to the foreign network;
decapsulating the information packet at the foreign network;
transmitting the information packet to the appropriate mobile node on the foreign network using the virtual private network identifier extension; and
said virtual private network identifier extension having an organization identifier component to identify the virtual private network authority occupying at least three data bytes and an index value component to identify the specific virtual private network occupying at least of four data bytes, with said organization identifier associated with a plurality of index values.

9. The method of transmission of claim 8 further comprising the step of:
issuing a registration request for the foreign agent on the foreign network using the virtual private network identifier extension.

10. The method of transmission of claim 8 further comprising the step of:
registering the mobile node with the home agent on the home network using the virtual private network identifier extension.

11. The method of transmission of claim 10 further comprising the step of:
registering the mobile node with the foreign agent on the foreign network using the virtual private network identifier extension.

12. The method of transmission in claim 8 wherein the information packet contains a flag bit field that signifies the presence of a virtual private network identifier extension.

13. A method of transmitting information packets to a mobile node on a foreign network from the mobile node's home network comprising the steps of:
providing a virtual private network association with the mobile node, said virtual private network resides on the home network;
encapsulating an information packet with a two-part virtual private network identifier extension occupying a predetermined amount of available data space within the information packet address header, and a care-of address identifier for the foreign network;
transmitting the information packet from the home network to the foreign network;
receiving the information packet from the home agent at the foreign agent;
decapsulating the information packet at the foreign network, and routing the information packet to the mobile node using the virtual private network identifier extension; and
including the virtual private network identifier extension in a control message, discovery message, agent advertisement, registration request, or registration reply.

14. The method of transmitting information packets in claim 13 further comprising the steps of:
encapsulating information packets at the foreign network using the virtual private network identifier extension;
transmitting the information packet to the home network;
decapsulating the information packet at the home network;
using the virtual private network identifier extension to transmit the information packet to the virtual private network.

15. The method of transmitting information packets in claim 13 wherein the virtual private network identifier extension has a first part organizational identifier and a second part index value, with said identified organization associated with a plurality of index values, each index value corresponding to a separate virtual private network.

16. The method of transmitting information packets in claim 13 wherein the home network has a home agent that routes the information packet to the virtual private network using the virtual private network identifier extension.

17. The method of transmitting information packet in claim 13 wherein the foreign network has a foreign agent that identifies the mobile node using the virtual private network identifier extension.

18. The method of transmitting information packet in claim 17 wherein the home network has a home agent that routes information packet to the virtual private network using the virtual private network identifier extension.

* * * * *